June 11, 1968 C. F. AULT 3,388,349
METHOD FOR REDUCING INTERFERENCE CAUSED BY ELECTROMAGNETIC RADIATION FROM CLOCK CONTROLLED SYSTEMS
Filed Nov. 9, 1964
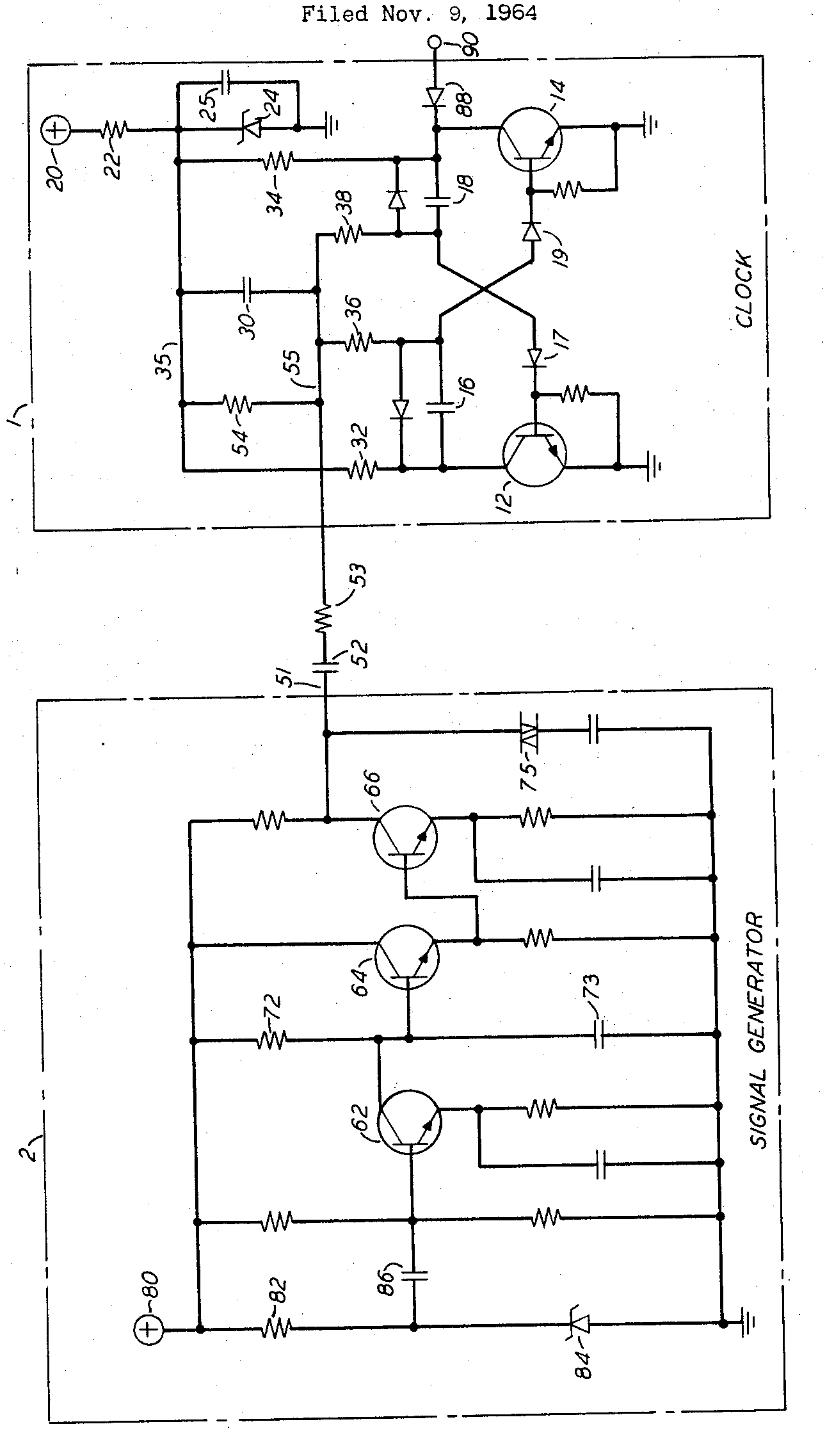
INVENTOR
C.F. AULT
BY D. E. Sudeker
ATTORNEY United States Patent Office
3,388,349
Patented June 11, 1968

3,388,349

METHOD FOR REDUCING INTERFERENCE CAUSED BY ELECTROMAGNETIC RADIATION FROM CLOCK CONTROLLED SYSTEMS

Cyrus F. Ault, Lincroft, N.J., assignor to Bell Telephone Laboratories, Incorporated, a corporation of New York
Filed Nov. 9, 1964, Ser. No. 409,836
15 Claims. (Cl. 332—18)

This invention relates to clock controlled systems and more particularly to a method and arrangement for reducing interference caused by electromagnetic radiation from clock controlled systems.

In many fields today, and especially in the communications, computer, and data processing fields, various systems are employed which utilize or are controlled by a clock. This clock generally comprises some form of oscillator for generating timing pulses at a predetermined frequency, which pulses are employed at various points throughout the system for timing or synchronizing the operation thereof. The clock may also include circuitry for counting down the basic predetermined timing pulse frequency to provide timing pulses at other frequencies which are subharmonics of the basic frequency of the clock oscillator. problems frequently arise in connection with the operation of these systems due to electromagnetic radiation produced thereby, a substantial part of which radiation is related to the clock timing pulses. The electromagnetic radiation is often of sufficient intensity to cause excessive interference with other equipment, such as communications receivers.

A well-known method of reducing the radiated electromagnetic energy to an acceptable level is to shield the system equipment. This has proved very effective where the equipment is enclosed and relatively compact. However, in systems where the equipment is not normally enclosed, in larger systems, and particularly in systems where the equipment is distributed over a considerable area, shielding is neither a desirable nor a practical solution. The amount of shielding required is rather extensive in such instances and thus represents an expensive solution to the problem. Further, in such systems shielding may give rise to operational and maintenance difficulties due to cooling problems and due to poor access to the equipment.

Accordingly, it is a general object of this invention to provide a new and improved method for reducing interference caused by electromagnetic radiation from clock controlled systems.

A more specific object of this invention is to reduce interference caused by electromagnetic radiation from clock controlled systems by a method which is simple and economical and which overcomes the disadvantages of known methods.

A further object of this invention is to reduce interference caused by electromagnetic radiation from clock controlled systems without modifying the system operation and without shielding the system equipment.

In accordance with a feature of my invention, the above and other objects are attained in a simple and economical manner by modulating the frequency of the system clock. The electromagnetic radiation produced by the clock timing pulses is concentrated at discrete frequencies which are harmonics of the basic clock frequency and subharmonics thereof in the case of timing pulses which are counted down from the basic clock frequency. It is at one or more of these discrete frequencies that interference with nearby communications equipment may result. I have found that by modulating the frequency of the system clock the total radiated electromagnetic energy is distributed at a considerably lower intensity over the frequency modulation spectrum rather than having the energy concentrated at the original discrete frefuencies. Thus the energy radiated at any particular frequency is considerably reduced, thereby reducing interference.

A further feature of my invention relates to the use of a noise signal for modulating the frequency of a system clock to reduce interference caused by electromagnetic radiation from the system.

The above and other objects and features of the present invention may be fully apprehended from the following detailed description when considered with reference to the accompanying drawings, which shows an illustrative embodiment of an arrangement for performing the method of the present invention.

In the drawing, an illustrative clock 1 is shown for providing timing pulses at output terminal 90, which timing pulses may be employed, for example, to control the operation of communications or data processing equipment. The timing pulses are provided at terminal 90 at a predetermined frequency according to the component values of clock 1, and may be further counted down to provide timing pulses at frequencies which are subharmonics of the predetermined clock frequency. The spectrum of electromagnetic energy radiated by the system thus comprises discrete frequencies which are harmonics of the predetermined clock frequency and also comprises discrete frequencies which are subharmonics of the clock frequency in the case of timing pulses which are counted down from the clock frequency. Interference with nearby communications equipment may result from the electromagnetic radiation at one or more of these discrete frequencies. In accordance with the present invention this interference is reduced substantially to an acceptable level by frequency modulating clock 1.

Clock 1, in the illustrative embodiment of the drawing, comprises a nonsaturating astable multivibrator which operates at a predetermined repetition frequency to provide timing pulses through diode 88 to output terminal 90. The multivibrator includes transistors 12 and 14, the base of transistor 12 being connected to the collector of transistor 14 via diode 17 and capacitor 18, and the base of transistor 14 being connected through diode 19 and capacitor 16 to the collector of transistor 12. The collectors of transistors 12 and 14 are connected through respective resistors 32 and 34 to conductor 35. The bases of transistors 12 and 14 are connected through respective resistors 38 and 36 to conductor 55 and thence through resistor 54 to conductor 35. Bypass capacitor 30 is connected in parallel with resistor 54 between conductors 35 and 55. Conductor 35 is connected through resistor 22 to source of potential 20 which is regulated by Zener diode 24 to provide a predetermined constant supply potential to conductor 35, and thus to conductor 55.

As is well known in the art, the repetition frequency of the multivibrator is principally determined by capacitors 16 and 18, resistors 36 and 38, and the supply potential on conductor 35 applied through resistor 54 to conductor 55. For the purposes of illustration herein, it may be assumed that the basic repetition frequency of the multivibrator is 2 megacycles. Thus, electromagnetic energy radiated from the system occurs at 2 megacycles and at harmonics of 2 megacycles, i.e., at 4 megacycles, 6 megacycles, 8 megacycles, 10 megacycles, etc.

The basic repetition frequency of clock 1 is modulated in accordance with the present invention by the output of signal generator 2 which is connected over lead 51 through blocking capacitor 52 and resistor 53. The output of signal generator 2, in the illustrative embodiment of the drawing, is a noise signal which is derived from the breakdown of Zener diode 84, direct current from source 80 being connected through resistor 82 and Zener diode 84 to ground. The noise signal from Zener diode 84 is extended through blocking capacitor 86 to a three-stage amplifier comprising transistors 62, 64, and 66. The amplified noise signal output on lead 51 is clipped by varistor 75 to a predetermined amplitude which may be, for example, on the order of several volts peak to peak. Resistor 53 forms a voltage divider network with resistor 54 which is connected to ground via conductor 35 and capacitor 25, further dropping the amplitude of the noise signal on lead 51 to the particular level required for providing the desired frequency deviation, or peak variation in the predetermined frequency of clock 1, as will be described further hereinbelow.

The frequency of clock 1, as mentioned above, is determined in part by the supply potential applied to conductor 55 by source 20. The frequency of clock 1 is deviated or varied from its predetermined frequency in the illustrative embodiment herein by varying the supply potential on conductor 55 in accordance with the noise signal on lead 51 from signal generator 2. The effect of modulating the frequency of clock 1 is to vary the point in time of the rise and fall, that is, of the leading and trailing edges, of the timing pulses. This pulse edge variation is sometimes referred to as jitter. The larger the clock frequency deviation the greater the jitter placed on the timing pulse edges. For the greatest reduction in interference, in accordance with the present invention, the frequency variation or deviation of clock 1 should be as large as practicable within the limits of the particular system in which the timing pulses are employed. Generally speaking, the amount of jitter permissible without adversely affecting system operation is quite small, permitting a frequency deviation no greater than several percent which, however, is sufficient to substantially reduce interference.

Interrelated with the factor of frequency deviation of the clock is the frequency of the modulating signal. The frequency modulation spectrum comprises a number of sidebands around the clock frequency and around each harmonic thereof, with the selected frequency deviation determining the frequency swing around the clock frequency and its harmonics. The number of sidebands in the frequency modulation spectrum relative to the clock frequency and to each harmonic thereof is determined by the frequency of the modulating signal. The lower the modulation frequency the greater the number of sidebands and thus the greater the distribution of frequencies at which the electromagnetic energy is radiated by the system. Although the total radiated energy is essentially the same as when concentrated at the clock frequency and its harmonics, when the energy is distributed over the frequency modulation spectrum the intensity of the radiated energy at any particular frequency is reduced considerably.

Ideally, therefore, the clock frequency is modulated with a very low frequency in the audio range, such as 100 cycles per second, and with as large a frequency deviation as practicable within the limits of the system, thereby providing a relatively large frequency deviation ratio. Assuming a frequency deviation of one percent and a clock frequency of 2 megacycles, by way of example, the electromagnetic energy radiated by the system is distributed over a 40 kilocycle band at the clock frequency, over an 80 kilocycle band at 4 megacycles, over a 120 kilocycle band at 6 megacycles, etc. With a modulation signal frequency of 100 cycles per second, each band comprise a frequency modulation spectrum including the clock frequency or harmonic and sidebands spaced at 100 cycles per second intervals therefrom. In the illustrative example assumed above, therefore, the result of distributing the radiated electromagnetic energy is that the magnitude of the energy at any frequency within the 40 kilocycle band around 2 megacycles is advantageously less than five percent of the magnitude of the energy at 2 megacycles without frequency modulation of the clock. At the individual frequencies within the 80 kilocycle band around 4 megacycles, the energy is decreased to an even greater extent, since the bandwidth over which the energy is distributed is doubled. Thus, it will be apparent that the reduction in interference effected by the present invention is substantial at the clock frequency, and is even more pronounced at the frequencies in the higher harmonic frequency spectrums.

If the modulation signal is a discreate audio frequency as assumed above, however, it may give rise to audible audio signals in communications receivers at the various clock and harmonic frequencies. This is objectionable and may be avoided in accordance with an aspect of the present invention by using a noise signal for modulating the clock frequency, as shown in the illustrative embodiment in the drawing. The effect on communications receivers of a noise signal for modulation purposes is at worst a slight increase in the background noise level. In signal generator 2 the noise signal is limited to the audio frequency range by a low pass filter comprising resistor 72 and capacitor 73.

It is to be understood that the above-described arrangements are merely illustrative of the principles of the present invention. Numerous other arrangements may be devised by those skilled in the art without departing from the spirit and scope of the invention.

What is claimed is:

1. A method for reducing interference caused by electromagnetic radiation from a clock controlled system which comprises modulating the clock frequency.

2. A method for reducing interference caused by electromagnetic radiation from a clock controlled system which comprises modulating the clock frequency with a low frequency signal.

3. A method for reducing interference caused by electromagnetic radiation from a clock controlled system which comprises modulating the clock frequency with a noise signal.

4. A method for reducing interference caused by electromagnetic radiation from a clock controlled system which comprises modulating the clock frequency with a signal having frequency components only in the audio frequency band.

5. A method for reducing interference caused by electromagnetic radiation from a system employing a clock of predetermined frequency which method comprises modulating said predetermined frequency of said clock with a signal of one or more frequencies, each said signal frequency being substantially less than said predetermined frequency of said clock.

6. A method for reducing interference caused by electromagnetic radiation from a system employing a clock of predetermined frequency which method comprises modulating said predetermined frequency of said clock with a signal of one or more frequencies, each said signal frequency being substantially less than the peak variation of said predetermined frequency of said clock.

7. In a system controlled by an oscillator of predetermined frequency, a method for reducing interference caused by electromagnetic energy radiated from said system at said predetermined oscillator frequency and harmonic frequencies thereof, which method comprises distributing said electromagnetic energy at a substantially lower intensity over a spectrum of frequencies centered around said predetermined oscillator frequency and said harmonic frequencies.

8. In a system employing timing pulses generated by an oscillator of predetermined frequency, a method for reducing the level of electromagnetic energy radiated by said system at said predetermined frequency and at harmonics of said predetermined frequency, which method comprises modulating said predetermined frequency of said oscillator with a signal having frequency components substantially only in the audio frequency band.

9. In a system employing timing pulses generated by an oscillator of predetermined frequency, a method for reducing the level of electromagnetic energy radiated by said system at said predetermined frequency and at harmonics of said predetermined frequency, which method comprises modulating said predetermined frequency of said oscillator with a signal having a frequncy which is small relative to the peak variation of said predetermined frequency of said oscillator, thereby providing a relatively large frequency deviation ratio.

10. In a system controlled by a clock of predetermined frequency, the combination for reducing interference caused by electromagnetic radiation from said system comprising a noise signal generator, and means for modulating said predetermined frequency of said clock with the noise signal output of said noise signal generator.

11. In a system controlled by a clock of predetermined frequency, the combination in accordance with claim 10 for reducing interference caused by electromagnetic radiation from said system further comprising means for limiting the frequency of said noise signal output of said noise signal generator to the audio frequency band.

12. In a system employing an oscillator of predetermined frequency the combination for reducing interference caused by electromagnetic radiation from said system at said predetermined frequency and at harmonic frequencies thereof comprising means for generating a signal of one or more frequencies each substantially lower than said predetermined frequency of said oscillator, and means for modulating said predetermined frequency of said oscillator with said signal.

13. In a system the combination comprising means for generating timing pulses at a predetermined frequency for controlling the operation of said system, said system radiating electromagnetic energy at said predetermined frequency and at harmonic frequencies thereof, and means for distributing said electromagnetic energy at a substantially lower intensity over a spectrum of frequencies centered around said predetermined frequency and said harmonic frequencies.

14. In a system the combination in accordance with claim 13 wherein said distributing means comprises means for generating a signal having frequency components substantially only in the audio frequency band, and means for modulating said predetermined frequency of said timing pulse generating means with said signal.

15. In a system the combination in accordance with claim 13 wherein said distributing means comprises means for modulating said predetermined frequency of said timing pulse generating means with a signal of a frequency which is small relative to the peak variation of said predetermined frequency of said timing pulse generating means, thereby providing a relatively large frequency deviation ratio.

No references cited.

JOHN KOMINSKI, *Primary Examiner.*